Figure 1:
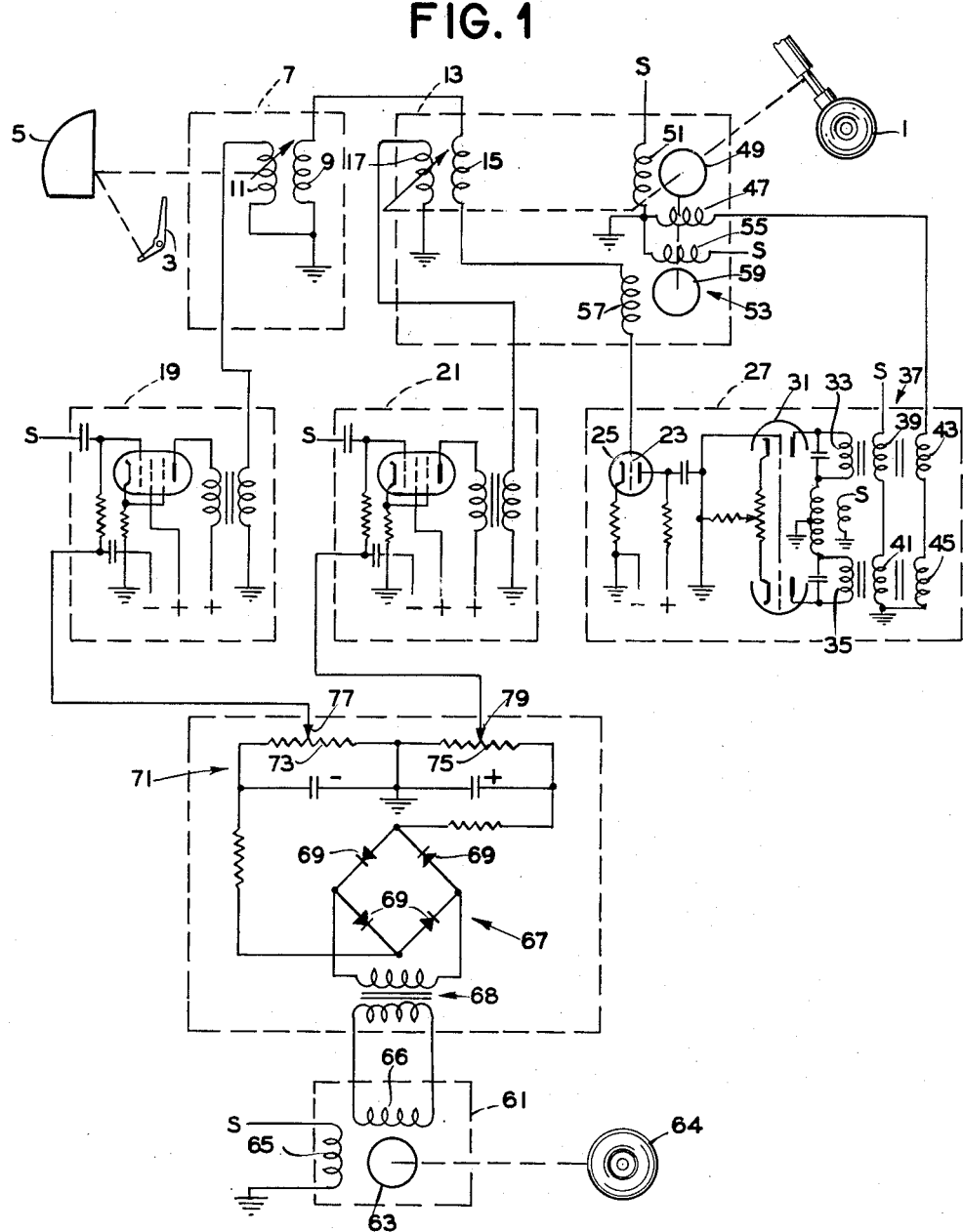

Sept. 4, 1956 A. W. BLANCHARD 2,762,007
CONTROL SYSTEM
Filed Nov. 3, 1950 4 Sheets-Sheet 1

INVENTOR.
ALLEN W. BLANCHARD
BY
*[signature]*
ATTORNEY

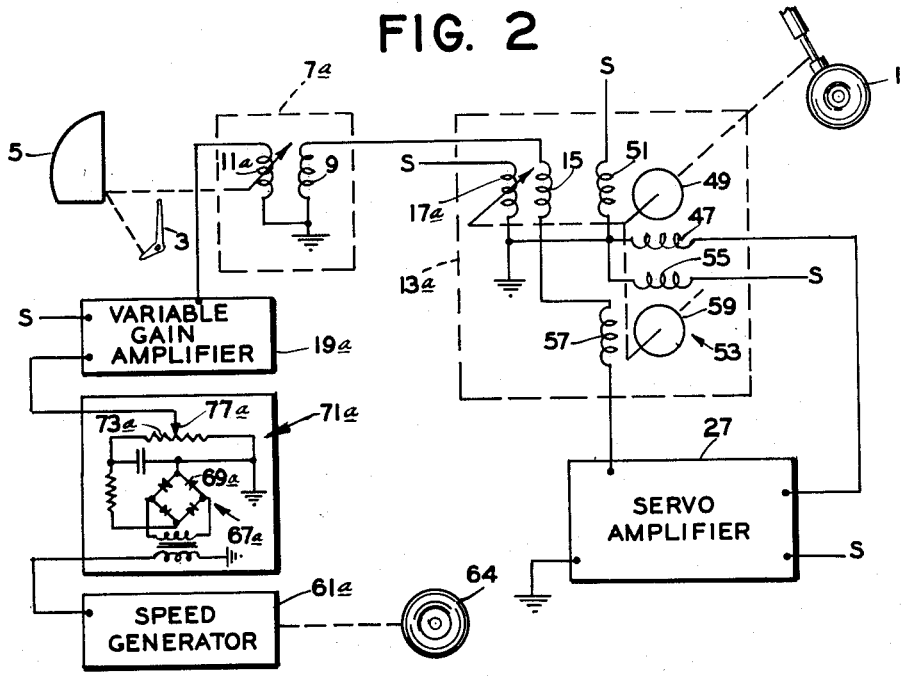
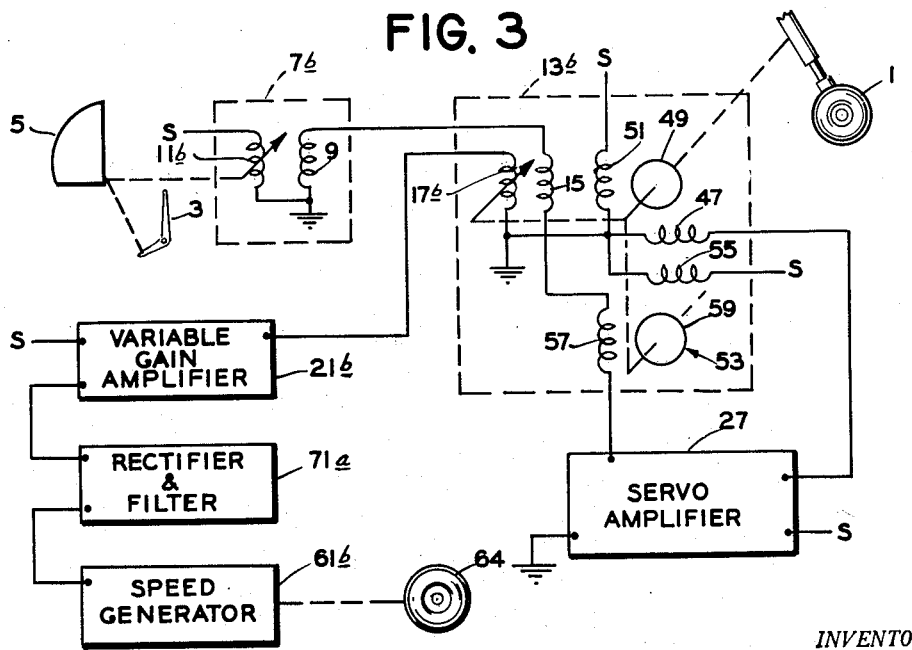

Sept. 4, 1956  A. W. BLANCHARD  2,762,007
CONTROL SYSTEM
Filed Nov. 3, 1950  4 Sheets-Sheet 3

INVENTOR.
ALLEN W. BLANCHARD
BY
*[signature]*
ATTORNEY

Sept. 4, 1956  A. W. BLANCHARD  2,762,007
CONTROL SYSTEM

Filed Nov. 3, 1950  4 Sheets-Sheet 4

INVENTOR.
ALLEN W. BLANCHARD
BY
*S. H. Hartz*
ATTORNEY

# United States Patent Office 2,762,007
Patented Sept. 4, 1956

2,762,007
CONTROL SYSTEM

Allen W. Blanchard, Allendale, N. J., assignor to Bendix Aviation Corporation, Teterboro, N. J., a corporation of Delaware Application November 3, 1950, Serial No. 193,928

8 Claims. (Cl. 318—489)

The invention relates to control systems, and more particularly to a control system in which the output of the system may be varied relative to the input by a changing condition. The system is especially adapted for steering a landing wheel of a craft.

Aircraft moving on the ground at relatively high speeds may be controlled by the rudder, but at low speeds, rudder control is ineffective. Some craft are provided with steerable wheels mechanically connected to the rudder control to steer the craft. When the craft is moving at high speed, the steerable wheel is displaced angularly by the rudder control and the craft may ground loop and the pilot may lose control of the craft.

One object of the present invention is to control a craft moving on the ground at high speed by the rudder alone, and then gradually relinquish control automatically to the steerable wheel as the craft decreases speed.

Another object is to vary response of the steerable wheel to movement of the rudder control as a function of craft speed.

A further object is to vary response of the steerable wheel to movement of the rudder control inversely to the speed of the craft.

Another object is to provide a control system in which response of a controlled member to a controlling member varies according to a changing condition.

The foregoing and other objects and advantages of the invention will appear more fully hereinafter from a consideration of the detailed description which follows, taken together with the accompanying drawings wherein six embodiments of the invention are illustrated. It is to be expressly understood, however, that the drawings are for the purposes of illustration and description only, and are not to be construed as defining the limits of the invention.

The invention contemplates a control system in which response of a controlled member to a controlling member varies as a function of a changing condition. A transmitter device provides signals corresponding to the position of the controller, and a follow-up device provides signals corresponding to the position of the controlled member. Means responsive to the error signal between the transmitter and follow-up devices is drivably connected to the controlled member. Means is provided for energizing the transmitter and follow-up devices, and means responsive to a changing condition varies relative energization of the transmitter and follow-up devices, whereby response of the controlled member to the controller varies as a function of the changing condition.

Figure 5:
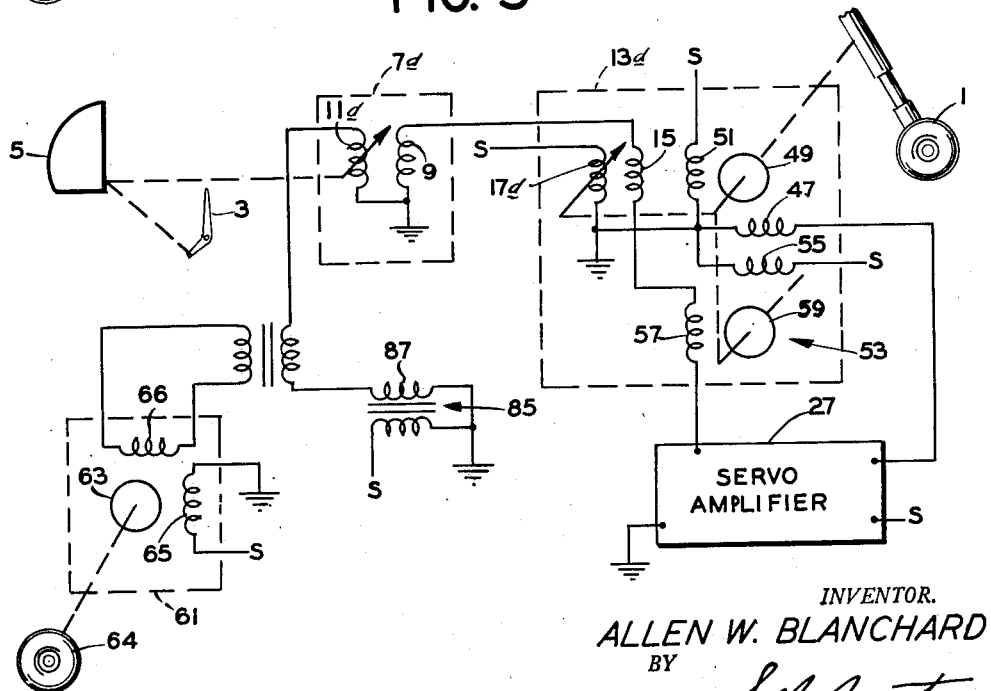
Figure 6:
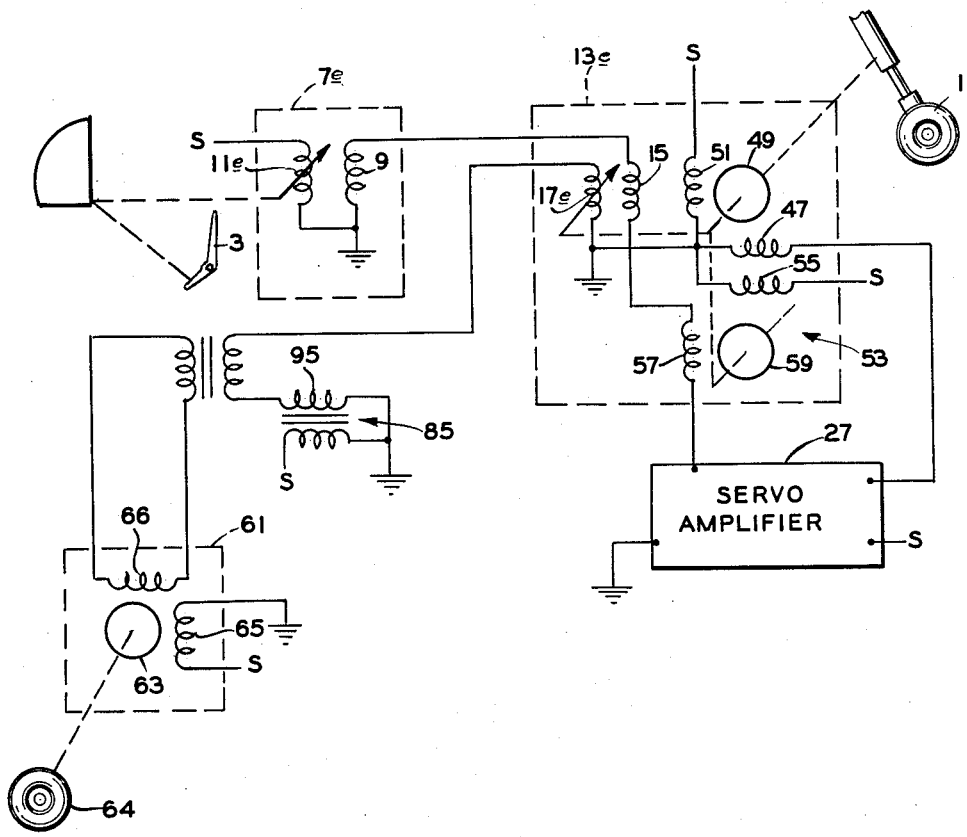
Figure 7:
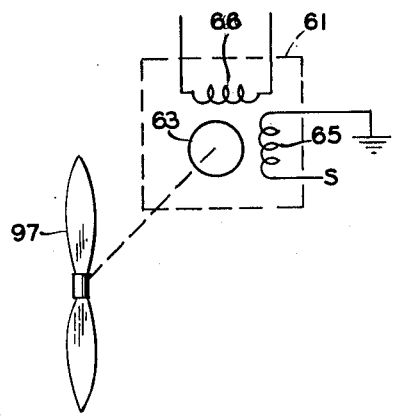

In the drawings, Figure 1 is a schematic wiring diagram showing a control system constructed according to the invention;

Figures 2, 3, 4, 5 and 6 are schematic wiring diagrams partially in block form showing five other embodiments of the invention; and Figure 7 shows an arrangement for driving a signal generator at a speed corresponding to the integrated air speed of the craft.

Referring now to the drawings for a more detailed description of the novel control system of the present invention, the control system is shown in Figure 1 as controlling a steerable wheel 1 of an aircraft in response to movement of a controller 3, which may be operated manually or by an automatic pilot controlled by compass heading or radio guidance signals, or in any other suitable manner. A rudder 5 is drivably connected to controller 3 for angular displacement about a vertical axis.

An inductive transmitter device 7 has a single phase stator winding 9 and a single phase rotor winding 11 drivably connected to the rudder so that angular displacement of the rotor winding relative to the stator winding provides signals corresponding to angular displacement of the rudder from trim position. An inductive follow-up device 13 has a stator winding 15 and a rotor winding 17 drivably connected to the steerable wheel so that angular displacement of the rotor winding relative to the stator winding provides signals corresponding to angular displacement of the steerable wheel from straight ahead position.

Rotor windings 11, 17 are energized by the outputs of variable gain amplifiers 19, 21, respectively, connected to an alternating power source S, and controlled in the manner described hereinafter.

The error signal developed by the transmitter and follow-up devices is applied to the grid 23 of the input stage 25 of a servo amplifier 27. The amplifier includes, in addition to the input stage 25, a discriminator 31 to determine the phase of the signal and a magnetic amplifier 37. The discriminated output of the amplifier is impressed on the saturable windings 33, 35 of magnetic amplifier 37. The primary windings 39, 41 of magnetic amplifier 37 are connected in series aiding relation to alternating power source S, and secondary windings 43, 45 oppose one another and are connected in series with the variable phase 47 of a two-phase motor 49 drivingly connected to steerable wheel 1 and rotor winding 17 of follow-up device 13. The fixed phase winding 51 of motor 49 is connected to alternating power source S.

A rate generator 53 of the kind shown and described in Riggs Patent No. 2,115,086, issued April 26, 1938, has a pair of stator windings 55, 57 disposed at right angles to one another. Stator winding 55 is connected to alternating power source S, and stator winding 57 is connected in series with stator winding 9 of transmitter device 7 and stator winding 15 of follow-up device 13 to the grid 23 of input stage 25 of amplifier 27.

A squirrel cage rotor 59 is drivably connected to motor 49 and provides a rate signal in stator winding 57 proportional to motor speed, as described in the above-mentioned patent. The rate signal is applied to the input stage 25 of amplifier 27 with the error signal from transmitter device 7 and follow-up device 13.

When rotor winding 11 of transmitter device 7 is displaced angularly relative to stator winding 9 by movement of the rudder controller, an error signal corresponding to relative displacement of the transmitter and follow-up devices is applied to amplifier 27, and the output of the amplifier controls motor 49, which angularly displaces wheel 1 until rotor winding 17 of follow-up device 13 is at null position. With uniform excitation of rotor winding 11 of transmitter device 7 and rotor winding 17 of follow-up device 13, angular displacement of the steerable wheel corresponds to angular displacement of the rudder.

To gradually decrease response of the steerable wheel to movement of the rudder controller as the speed of the craft increases, excitation of rotor winding 11 of transmitter device 7 and rotor winding 17 of follow-up device 13 is varied by varying the outputs of amplifiers 19, 21, as described below.

An alternating current generator or transmitter device 61 has a squirrel cage rotor 63 driven by a landing wheel 64 or at a speed proportional to the air speed of the craft, as shown in Figure 7 and described hereinafter. A stator winding 65 is connected to source S and a stator winding 66 at right angles thereto is connected through a transformer 68 to a rectifying bridge circuit 67 including a rectifier device 69 in each arm of the bridge. The rectified voltage from the bridge is filtered by an R. C. filter 71 having a pair of potentiometer resistors 73, 75 connected in series across the output of the filter and with their adjacent ends connected to ground. The movable taps 77, 79 of the potentiometers may be adjusted to select suitable voltages and are connected to the inputs of variable gain amplifiers 19, 21, and the output of the filter to amplifiers 19, 21 serves to vary the outputs of the amplifiers. The output of speed transmitter device 61 is applied to amplifier 19 as an increasingly negative bias and to amplifier 21 as an increasingly positive bias with increase of generator speed.

With this arrangement, as the craft increases speed and the output of ground speed transmitter 61 increases, the output of amplifier 19 decreases and excitation of rotor winding 11 of transmitter device 7 decreases accordingly, and the output of amplifier 21 increases and excitation of rotor winding 17 of follow-up device 13 increases accordingly. Under these conditions, only a small angular displacement of rotor winding 17 of follow-up device 13 and of steerable wheel 1 is required to cancel the error signal created by substantial angular displacement of rotor winding 11 of transmitter device 7.

As the ground speed of the craft and the output of ground speed transmitter device 61 decrease, the output of amplifier 19 increases and the output of amplifier 21 decreases so that relatively large angular displacement of rotor 17 of follow-up device 13 and of steerable wheel 1 is required to nullify the error signal from transmitter device 7.

The arrangement shown in Figure 2 is substantially the same as the arrangement shown in Figure 1, except that rotor winding 17a of follow-up device 13a is energized directly from alternating power source S, and the rectified output of speed transmitter 61a controls only the output of amplifier 19a and energization of rotor winding 11a of transmitter device 7a. The output of speed transmitter device 61a is applied to the amplifier as an increasingly negative bias with increase of generator speed. The biasing voltage may be adjusted by moving adjustable tap 77a on resistor 73a connected across the output of filter 71a. The system operates in substantially the same manner as the arrangement in Figure 1, except that energization of rotor winding 17a of follow-up device 13a remains constant and energization of rotor winding 11a of transmitter device 7a only is controlled by the output of ground speed generator 61a.

The system shown in Figure 3 is substantially the same as the system shown in Figure 1, except that in Figure 3, rotor winding 11b of rudder transmitter device 7b is energized directly from alternating power source S, and the rectified output of speed transmitter device 61b controls only the output of amplifier 21b and energization of rotor winding 17b of follow-up device 13b. The output of speed transmitter device 61b is applied to the amplifier as an increasingly positive bias with increase of generator speed. The system described in Figure 3 operates substantially the same as the system shown in Figure 1 except that excitation of rotor winding 11b of transmitter device 7b remains constant and excitation of rotor winding 17b of follow-up device 13b only is controlled by the rectified output of speed transmitter device 61b.

Figure 4:
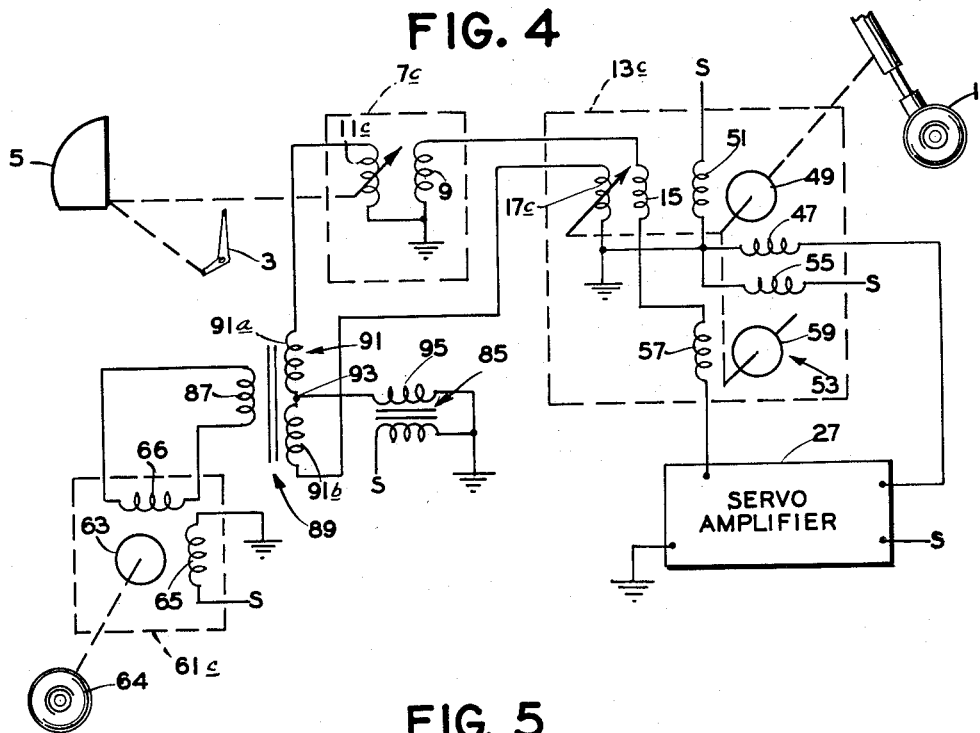

The arrangement shown in Figure 4 is substantially the same as the system shown in Figure 1 in that excitation of rotor winding 11c of transmitter device 7c decreases as the ground speed of the craft increases and excitation of rotor winding 17c of follow-up device 13c increases as the ground speed of the craft increases. Rotor winding 11c of transmitter device 7c and rotor winding 17c of follow-up device 13c are energized from alternating power source S through a transformer 85. The output of ground speed transmitter 61c is applied to the primary winding 87 of a transformer 89 having a center-tapped secondary winding 91 with the center-tap 93 of secondary winding 91 connected to the secondary winding 95 of transformer 85. One half 91a of secondary winding 91 is connected in series with rotor winding 11c of rudder transmitter 7c, and the other half 91b of secondary winding 91 is connected in series with rotor winding 17c of follow-up device 13c. With this arrangement, a voltage corresponding to the voltage induced in ground speed transmitter device 61c is subtracted from the voltage induced in secondary winding 95 of transformer 85 to energize rotor winding 11c of transmitter device 7c and a voltage corresponding to the voltage induced in ground speed transmitter device 61c is added to the voltage induced in secondary winding 95 of transformer 85 to energize the rotor winding 17c of follow-up device 13c. Operation of the system shown in Figure 4 is otherwise substantially the same as the system of Figure 1.

The arrangement shown in Figure 5 corresponds generally to the system shown in Figure 4 except that in Figure 5, rotor winding 17d of follow-up device 13d is energized from alternating power source S, and excitation of rotor winding 11d of transmitter device 7d varies in accordance with ground speed of the craft, as in Figure 4. Operation of the system shown in Figure 5 is substantially the same as operation of the system shown in Figure 2.

The arrangement shown in Figure 6 is substantially the same as the system shown in Figure 4 except that rotor winding 11e of transmitter device 7e is energized by an alternating power source S, and excitation of rotor winding 17e of follow-up device 13e varies in accordance with ground speed of the craft, as in Figure 4. Operation of the system shown in Figure 6 is substantially the same as operation of the system shown in Figure 3.

As indicated above, instead of driving the ground speed transmitter 61 in the several embodiments by the landing wheels to provide voltages corresponding to ground speed of the craft, rotor 63 of the ground speed transmitter may be driven by wind pressure on a propeller 97, as shown in Figure 7, to provide voltages corresponding to the integrated air speed of the craft.

In all of the arrangements described, response of the steerable wheel to movement of the rudder controller is a function of ground speed or air speed of the craft, and angular displacement of the steerable wheel to rudder controller movement varies inversely to craft speed. The craft, when moving at high speed on the ground, may be controlled by the rudder alone, and as the speed of the craft decreases, control of the craft is relinquished by the rudder to the steerable wheel.

Although the control system of the present invention has been described in connection with controlling relative movement of a rudder and steerable wheel of aircraft in response to rudder controller movement, it should be understood that the system may be used to vary response of a controlled member to a controlling member as a function of a changing condition.

It is to be expressly understood that the invention is not limited to the several embodiments of the invention illustrated and described because various changes can be made in the design and arrangement of the parts without departing from the spirit and scope of the invention as the same will now be understood by those skilled in the art.

What is claimed is:

1. In combination, a controller, a transmitter device for providing signals corresponding to the position of said controller, a controlled member responsive to said controller, a follow-up device for providing signals corresponding to the position of said controlled member, means responsive to the error signal between said transmitter and follow-up devices drivably connected to said controlled member, means for energizing said transmitter and follow-up devices, a signal generator, and means responsive to changes in the operating speed of the signal generator for varying relative energization of said devices, whereby the response of said controlled member to said controller varies as a function of the changes in the operating speed of the signal generator.

2. In combination, a controller, a transmitter device for providing signals corresponding to the position of said controller, a controlled member responsive to said controller, a follow-up device for providing signals corresponding to the position of said controlled member, means responsive to the error signal between said transmitter and follow-up devices drivably connected to said controlled member, means for energizing said transmitter and follow-up devices, a signal generator, means for varying the magnitude of the signal output of the generator, and means responsive to changes in the magnitude of the signal output of the generator for varying energization of at least one of said devices, whereby the response of said controlled member to said controller varies as a function of the changing output of the generator.

3. In combination, a controller, a transmitter device for providing signals corresponding to the position of said controller, a controlled member responsive to said controller, a follow-up device for providing signals corresponding to the position of said controlled member, means responsive to the error signal between said transmitter and follow-up devices drivably connected to said controlled member, means including an amplifier for energizing each of said devices, a signal generator, and means responsive to changes in the operating frequency of the generator and providing biasing voltages for said amplifiers for decreasing energization of one of said devices and for increasing energization of the other of said devices, whereby the response of said controlled member to said controller varies as a function of the changes in the operating frequency of the signal generator.

4. In combination, a controller, a transmitter device for providing signals corresponding to the position of said controller, a controlled member responsive to said controller, a follow-up device for providing signals corresponding to the position of said controlled member, means responsive to the error signal between said transmitter and follow-up devices drivably connected to said controlled member, means for energizing each of said devices, at least one of said means including an amplifier, a signal generator, means for changing the magnitude of the output signals of the generator, and means responsive to changes of magnitude of the output signals of the generator and providing a biasing voltage for said amplifier for changing energization of the associated device in accordance with the said changes, whereby the response of said controlled member to said controller varies as a function of changes in the magnitude of the output signals of the generator.

5. In combination, a controller, a transmitter device for providing signals corresponding to the position of said controller, a controlled member responsive to said controller, a follow-up device for providing signals corresponding to the position of said controlled member, means responsive to the error signal between said transmitter and follow-up devices drivably connected to said controlled member, means for energizing said transmitter and follow-up devices, a generator, means for varying the magnitude of the output of the generator, and means responsive to changes in the magnitude of the output of the generator for simultaneously oppositely varying energization of said devices, whereby the response of said controlled member to said controller varies as a function of the changing of the output of the generator.

6. In combination, a controller, a transmitter device for providing signals corresponding to the position of said controller, a controlled member responsive to said controller, a follow-up device for providing signals corresponding to the position of said controlled member, means responsive to the error signal between said transmitter and follow-up devices drivably connected to said controlled member, a power source for energizng said transmitter and follow-up devices, a generator, means for varying the magnitude of the output of the generator, and means responsive to changes in the magnitude of the output of the generator and providing voltages of opposite phase, one of said voltages being of a phase opposite to the phase of the power source to decrease energization of one of said devices, and the other voltage being in phase with the power source to increase energization of the other of said devices, whereby the response of said controlled member to said controller varies as a function of the changing of the output of the generator.

7. In a device of the kind described adapted for use in a craft having a steerable wheel, a controller, a transmitter device for providing signals corresponding to the position of said controller, a follow-up device for providing signals corresponding to the angular displacement of said wheel, means responsive to the error signal between said transmitter and follow-up devices drivably connected to angularly displace said wheel, means for energizing said transmitter and follow-up devices, and means including a generator responsive to speed of the craft for varying relative energization of said devices, whereby angular displacement of said wheel in response to movement of said controller varies as a function of craft speed.

8. In a device of the kind described adapted for use in a craft having a steerable wheel, a controller, a transmitter device for providing signals corresponding to the position of said controller, a follow-up device for providing signals corresponding to the angular displacement of said wheel, means responsive to the error signal between said transmitter and follow-up devices drivably connected to angularly displace said wheel, means including an amplifier for energizing each of said devices, means responsive to speed of the craft to provide biasing voltages for said amplifiers for decreasing energization of one of said devices and for increasing energization of the other of said devices, whereby angular displacement of said wheel in response to movement of said controller varies as a function of craft speed.

References Cited in the file of this patent

UNITED STATES PATENTS

| | | |
|---|---|---|
| 2,190,390 | Thiry | Feb. 13, 1940 |
| 2,387,795 | Isserstedt | Oct. 30, 1945 |
| 2,429,642 | Newton | Oct. 28, 1947 |
| 2,452,311 | Markusen | Oct. 26, 1948 |
| 2,471,821 | Kutzler et al. | May 31, 1949 |
| 2,503,755 | Martin et al. | Apr. 11, 1950 |
| 2,612,331 | Frazier | Sept. 30, 1952 |